US006583941B1

(12) United States Patent
Coker et al.

(10) Patent No.: US 6,583,941 B1
(45) Date of Patent: Jun. 24, 2003

(54) METHOD AND APPARATUS FOR THERMAL ASPERITY RECOVERY FOR WORD SYNC DETECTION IN DATA CHANNELS

(75) Inventors: Jonathan Darrel Coker, Rochester, MN (US); Richard Leo Galbraith, Rochester, MN (US); Todd Carter Truax, Rochester, MN (US); Donald Earl Vosberg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,111

(22) Filed: Mar. 9, 2000

(51) Int. Cl.[7] ................................................ G11B 5/09
(52) U.S. Cl. ............................................ 360/25; 360/48
(58) Field of Search .............................. 360/25, 46, 65, 360/48, 51

(56) References Cited

U.S. PATENT DOCUMENTS

| 5,940,233 A | 8/1999 | Malone, Sr. | |
|---|---|---|---|
| 6,055,118 A | * 4/2000 | Du | 360/46 |
| 6,392,830 B1 | * 5/2002 | Malone, Sr. | 360/46 |

* cited by examiner

Primary Examiner—Regina N. Holder
Assistant Examiner—Varsha A. Kapadia
(74) Attorney, Agent, or Firm—Joan Pennington

(57) ABSTRACT

A method and apparatus are provided for thermal asperity recovery for word sync detection in data channels. A word sync field contains a plurality of word sync patterns. A word sync detector receives a read signal of the word sync field. The word sync detector identifies a first subset of the plurality of word sync patterns and starts a customer data read. When the word sync detector fails to identify the first subset of the plurality of word sync patterns, the read signal of the word sync field is received again. Then the word sync detector identifies a second predefined subset of the plurality of word sync patterns and starts a customer data read. A single word sync field is used instead of the conventional dual word sync fields required for each sector. The second predefined subset of the plurality of word sync patterns is smaller than the first subset. For example, when the first subset is defined as 4 of 8, the second predefined subset is 2 of 8. For example, when the first subset is defined as 6 of 12, the second predefined subset is 2 of 12.

16 Claims, 7 Drawing Sheets

TRACK FORMAT

| SECTOR GAP | 24 BYTES OF BIT SYNC | 8 BYTES WORD SYNC | 24 BYTES OF BIT SYNC | 8 BYTES WORD SYNC | 520 BYTES CUSTOMER DATA |
|---|---|---|---|---|---|

INITIAL READ GATE START

INITIAL WORD SYNC FOUND

DATA RECOVERY READ GATE START

DATA RECOVERY WORD SYNC FOUND

32 BYTE DELAY

START CUSTOMER DATA

PRIOR ART

FIG. 2

METHOD AND APPARATUS FOR THERMAL ASPERITY RECOVERY FOR WORD SYNC DETECTION IN DATA CHANNELS

FIELD OF THE INVENTION

The present invention relates generally to the data processing field, and more particularly, relates to a method and apparatus for thermal asperity recovery for word sync detection in data channels.

DESCRIPTION OF THE RELATED ART

Disk drive data channels require a word sync field to indicate the exact beginning of customer data after the training field or sync field. The occurrence of a thermal asperity (TA) in the word sync field can result in the inability to read the sector's customer data. While the manufacturing process attempts to find and mark off TA sites, the word sync field generally gets limited test coverage.

In addition, TAs can develop later, when the disk drive is in the field. As the user bit densities have increased, this problem has increased because the size of the TAs remain the same and a single TA can now corrupt a greater percentage of the word sync field.

Media dropouts and other grown defects in the word sync field similarly can result in the inability to read the sector's customer data. As used in the following specification and claims, the term thermal asperity (TA) should be understood to include media dropouts and other grown defects.

Referring to FIG. 2, there is shown a track format that includes dual word sync fields as disclosed in U.S. Pat. No. 5,940,233 issued Aug. 17, 1999 and assigned to the present assignee. The disclosed solution for thermal asperity recovery for word sync detection in data channels requires the use of dual word sync fields. The later sync field is normally used, but if it is corrupted by a TA, the earlier sync field is used instead and the second field is skipped over. This method has the disadvantage of reduced format efficiency. The effective sector overhead is about double as compared to the use of a single word sync field. All sectors in the disk drive incur this overhead penalty, even though only a small percentage of the sectors will ever have a TA event develop.

A need exists for an improved method and apparatus for thermal asperity recovery for word sync detection in data channels.

SUMMARY OF THE INVENTION

A principal object of the present invention is to provide an improved method and apparatus for thermal asperity recovery for word sync detection in data channels. Other important objects of the present invention are to provide such method and apparatus for thermal asperity recovery for word sync detection in data channels substantially without negative effect and that overcome many of the disadvantages of prior art arrangements.

In brief, a method and apparatus are provided for thermal asperity recovery for word sync detection in data channels. A word sync field contains a plurality of word sync patterns. A word sync detector receives a read signal of the word sync field. The word sync detector identifies a first subset of the plurality of word sync patterns and starts a customer data read. When the word sync detector fails to identify the first subset of the plurality of word sync patterns, the read signal of the word sync field is received again. Then the word sync detector identifies a second predefined subset of the plurality of word sync patterns and starts a customer data read.

In accordance with features of the invention, a single word sync field is used instead of the conventional dual word sync fields required for each sector. The second predefined subset of the plurality of word sync patterns is smaller than the first subset. For example, when the first subset is defined as 4 of 8, the second predefined subset is 2 of 8. For example, when the first subset is defined as 6 of 12, the second predefined subset is 2 of 12.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a diagram illustrating a prior art word sync timing and track format with dual word sync fields;

DETAILED DESCRIPTION OF THE PREFERRED EMBODIMENTS

Figure 1:
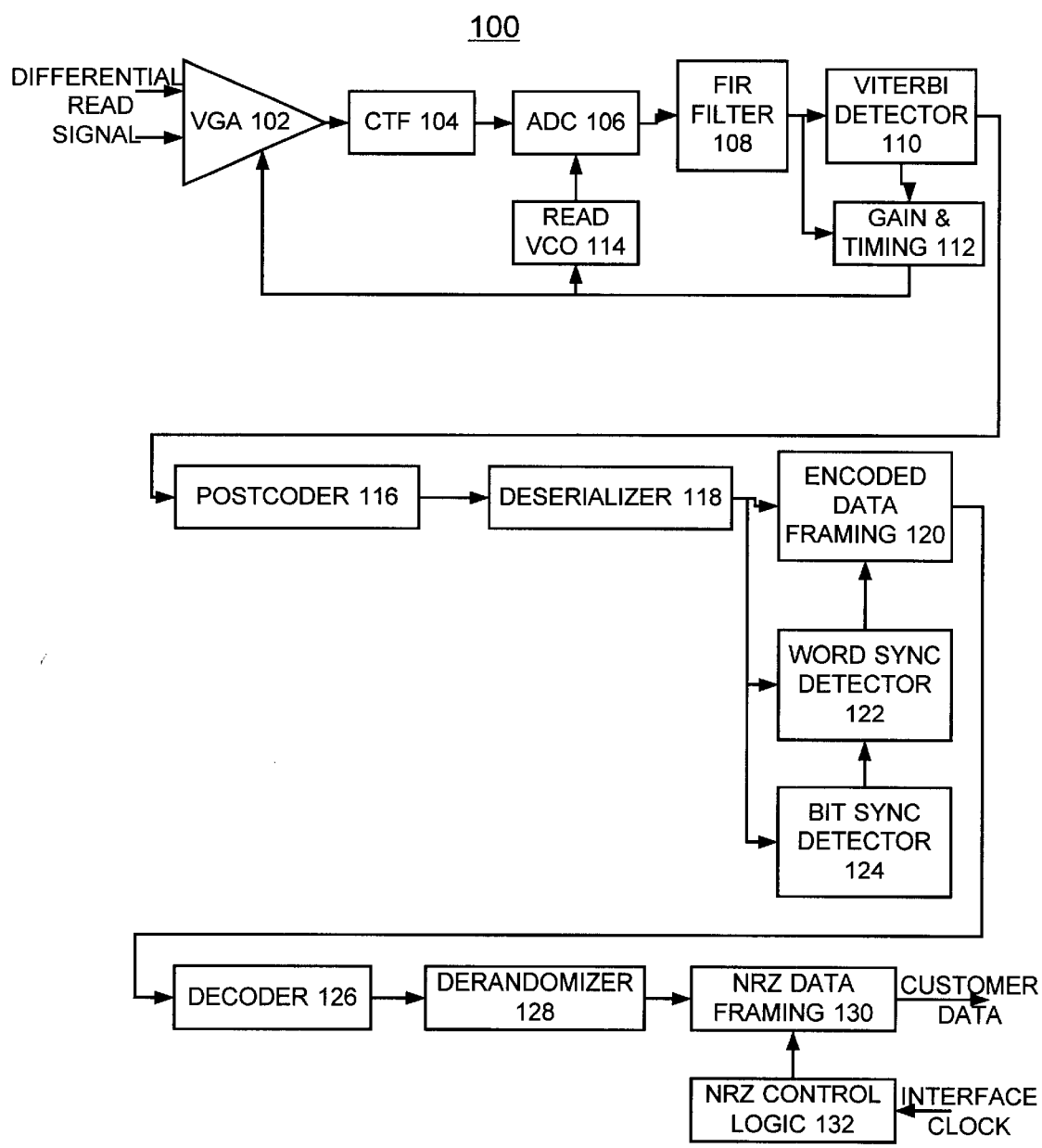
FIG. 1 is a block diagram representation illustrating a read data channel for implementing methods for thermal asperity recovery for word sync detection in data channels in accordance with the preferred embodiment.

Having reference now to the drawings, in FIG. 1, there is shown a read data channel of the preferred embodiment generally designated by the reference character 100. As shown in FIG. 1, data channel 100 includes a variable gain amplifier (VGA) 102 receiving a differential read signal input. A continuous time filter (CTF) 104 receives the output of VGA 102 and provides a filtered input to an analog-to-digital (ADC) 106. The filtered read signal is converted to a digital form by the ADC 106. The digital read signal is equalized using a finite impulse response (FIR) filter 108 coupled to the output of ADC 106. The FIR filter 108 applies digital sample values to a Viterbi detector 110 and a gain and timing control 112. The gain and timing circuit 112 provides a gain control signal to the VGA 102. A read voltage controlled oscillator (VCO) 114 provides a timing control signal to the ADC 106.

The output of the Viterbi detector 110 is applied to a postcoder 116 coupled to a deserializer 118 that converts a serial data stream into parallel data that can be operated on simultaneously. The parallel data output of deserializer 118 is applied to an encoded data framing block 120, a word sync detector 122 of the preferred embodiment and a bit sync detector 124 of the preferred embodiment. The bit sync detector 124 detects a predefined sync pattern, such as eight consecutive ones, in the parallel data stream output of deserializer 118. A second function of the bit sync detector 124 is to identify the phase of the sync field. The word sync detector 122 detects a word sync pattern that is a special, for example, 17 or 19 bit, repeating pattern used to provide a timing mark and signal the beginning of encoded and randomized customer data. Miss-detecting the word sync pattern or finding it early or late will corrupt the data in the entire sector. Because of this, redundancy and fault tolerance are very important. The output of the encoded data framing block 120 is applied to a decoder 126 connected to a derandomizer 128. A non-return-to-zero (NRZ) data framing block 130 controlled by a NRZ control logic 132 provides user output data or customer data.

In accordance with features of the invention, a method for thermal asperity recovery for word sync detection in data channels is provided. Recovery is enabled for word sync information that otherwise would be lost to corruption by a thermal asperity (TA). The word sync field contains multiple and repeated unique patterns. A subset of these patterns must be identified, typically at least one-half, in order to exactly determine the start of customer data. For example, 2 out of 4, 4 out of 8 and 6 out of 12 pattern matches typically are required. In the method of the preferred embodiment, if a TA prevents identifying this subset and the word sync field is missed, two possible data recovery routines exist. In the first case, the subset of identified patterns is reduced from 4 out of 8 down to 2 out of 8 with no loss in data start determination. Upon a sync word not found error in the file, a single data recovery step can reduce the criteria by a register write and read again. In the second case, the subset of identified patterns is reduced from 6 out of 12 down to 2 out of 12 and the start location will be in one of two known locations. Here two data recovery steps may be necessary. For the first step, the criteria is reduced and the reading of customer data is started at the earlier of the two known locations during a reread. If this read fails once again, the second recovery step is to again reduce the criteria and this time reading of customer data is started at the later of the two known locations. Using these data recovery steps, the amount of the sync word field that needs to be readable has been reduced by either 50% or 67%. This decreases the likelihood that a TA will interfere with finding word sync so that the customer data can successfully be recovered.

Figure 3:
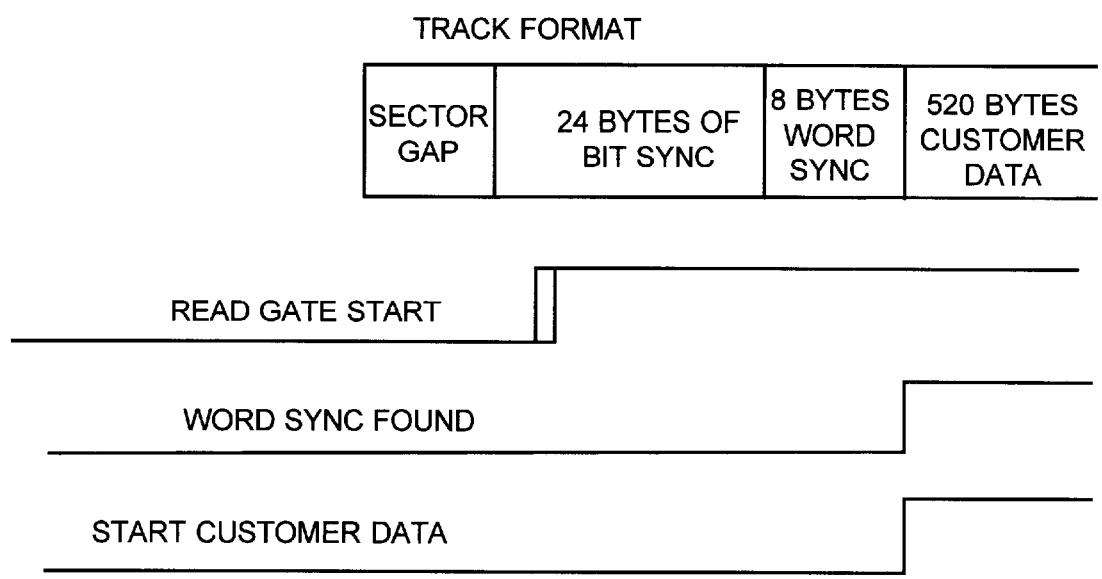
FIG. 3 is a timing diagram illustrating an 8-byte relaxed word sync in accordance with the preferred embodiment.
Figure 4:
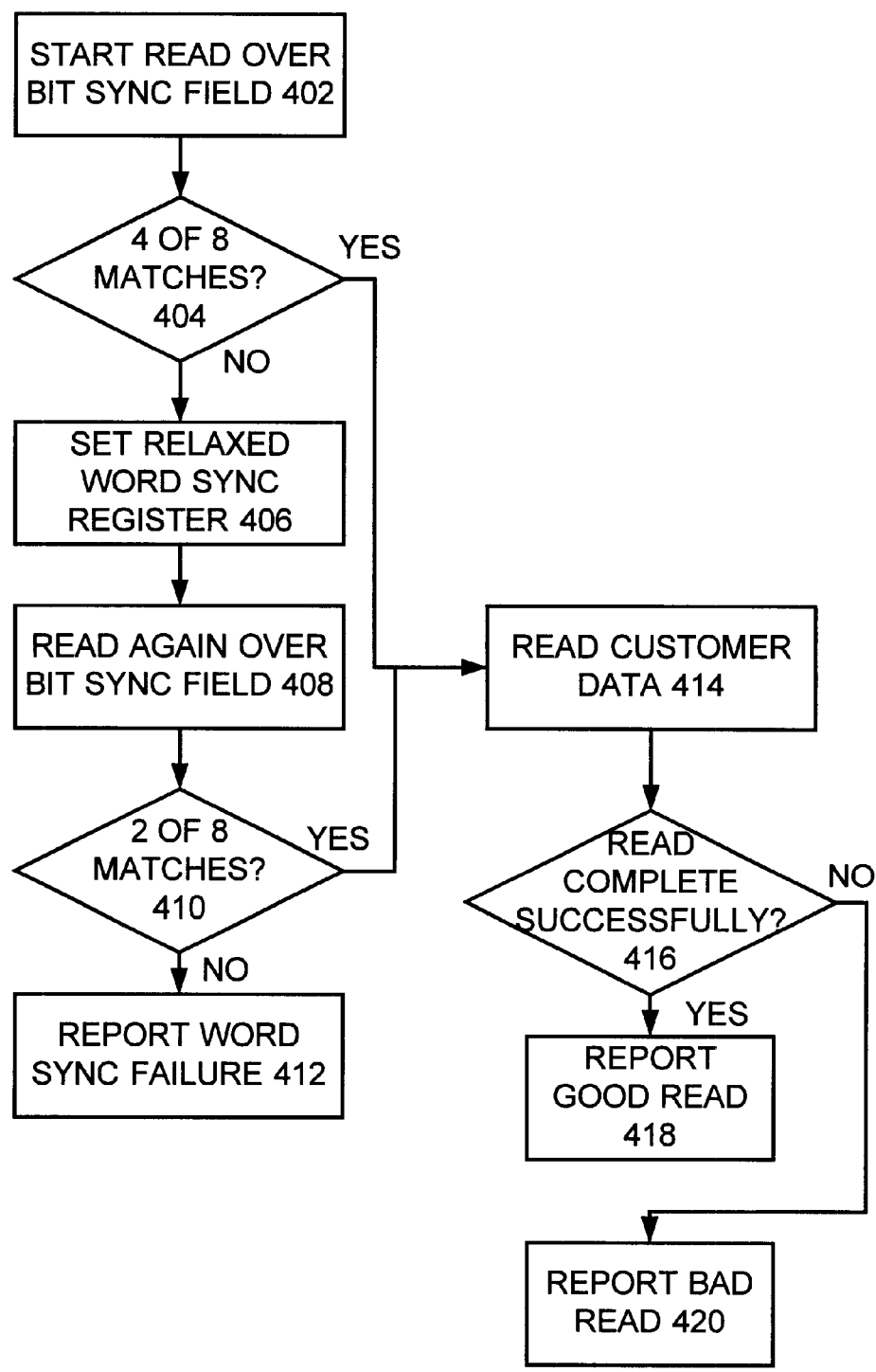
FIG. 4 is a flow chart illustrating exemplary sequential steps for thermal asperity recovery for word sync detection with the 8-byte word sync of FIG. 3 in data channels in accordance with the preferred embodiment.

Referring to FIGS. 3 and 4, there are shown a timing diagram illustrating an 8-byte relaxed word sync in accordance with the preferred embodiment and FIG. 4 illustrates exemplary sequential steps for thermal asperity recovery for word sync detection with the 8-byte word sync of FIG. 3 in accordance with the preferred embodiment. As compared to the prior art track format of FIG. 2, a single bit sync field and a single word sync field precedes 520 bytes of customer data, eliminating the overhead penalty of the prior art redundant word sync detection.

In FIG. 4, sequential steps start with a read over the bit sync field as indicated in a block 402. Checking whether 4 out of 8 pattern matches were found is performed as indicated in a decision block 404. When 4 out of 8 pattern matches were not found, a relaxed word sync register is set as indicated in a block 406. Next a read again over the bit sync field is performed as indicated in a block 408. Checking whether 2 out of 8 pattern matches were found is performed as indicated in a decision block 410. When 2 out of 8 pattern matches were not found, a word sync failure is reported as indicated in a block 412. Otherwise when 4 out of 8 pattern matches were found at decision block 404 or when 2 out of 8 pattern matches were found at decision block 410, then the customer data is read as indicated in a block 414. Checking whether the read did complete successfully is performed as indicated in a decision block 416. When the read did complete successfully, a good read is reported as indicated in a block 418. When the read did not complete successfully, a bad read is reported as indicated in a block 420.

Figure 5:
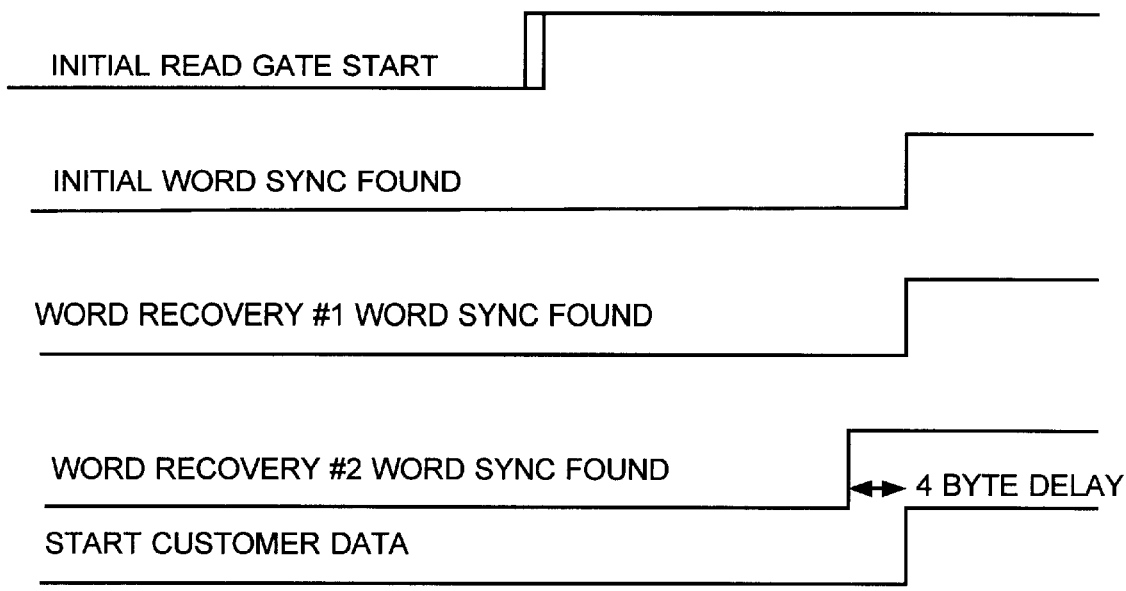
FIG. 5 is a timing diagram illustrating a 12-byte relaxed word sync in accordance with the preferred embodiment.
Figure 6A:
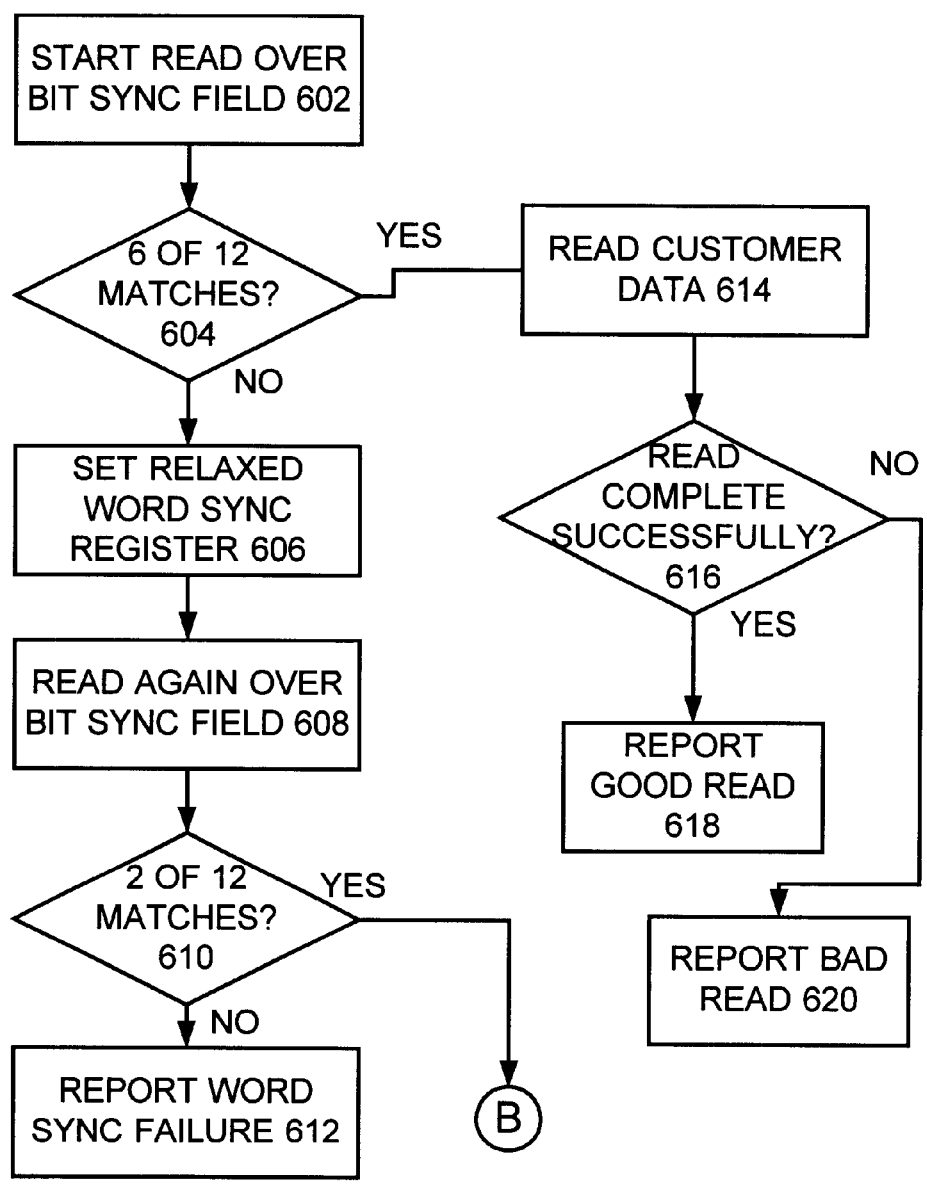
FIGS. 6A and 6B are flow charts illustrating exemplary sequential steps for thermal asperity recovery for word sync detection with the 12-byte word sync of FIG. 5 in data channels in accordance with the preferred embodiment.
Figure 6B:
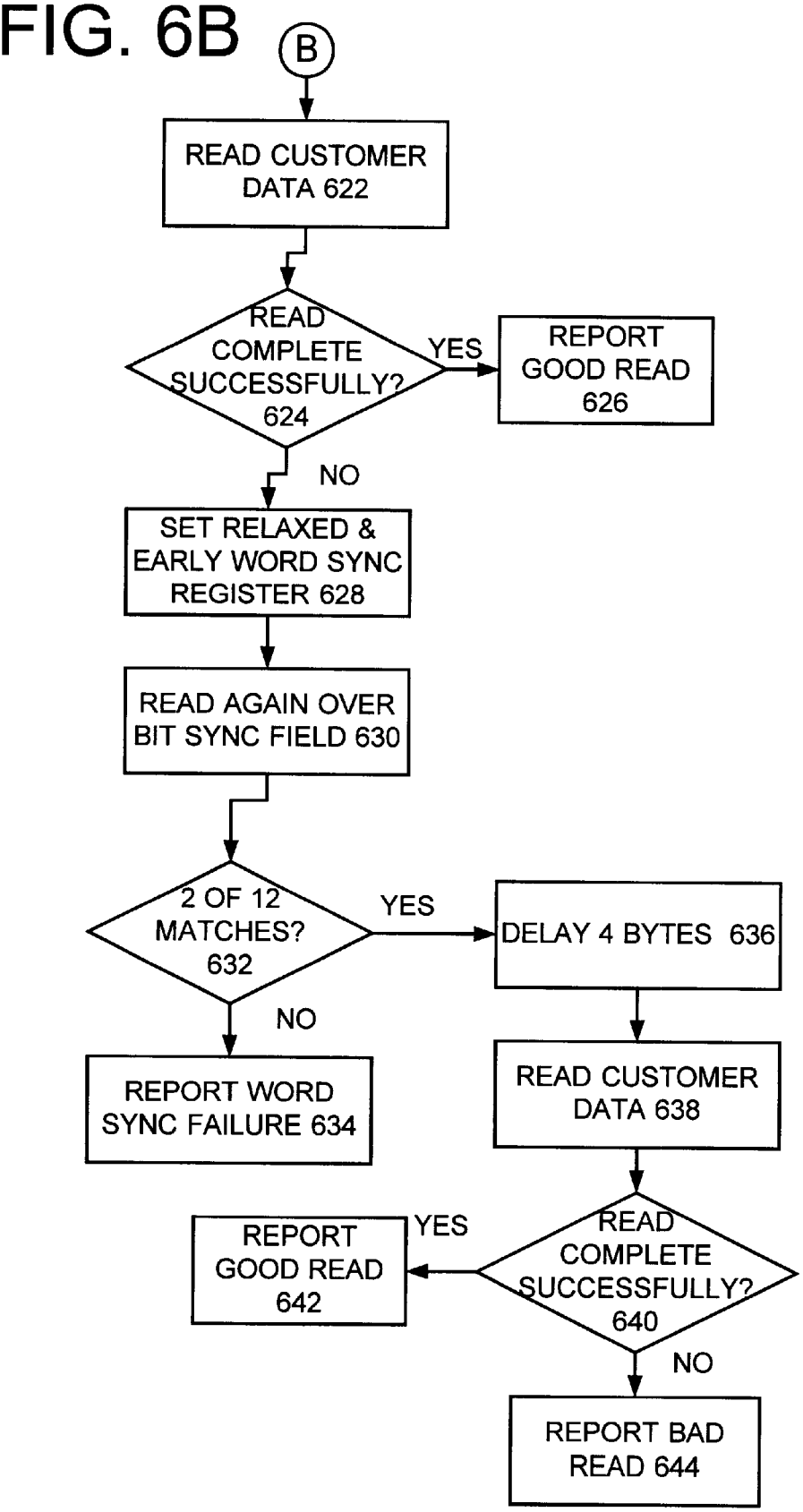

Referring to FIGS. 5, 6A and 6B, there are shown a timing diagram illustrating a 12-byte relaxed word sync in accordance with the preferred embodiment and FIGS. 6A and 6B illustrates exemplary sequential steps for thermal asperity recovery for word sync detection with the 12-byte word sync of FIG. 5 in accordance with the preferred embodiment. As compared to the prior art track format of FIG. 2, a single bit sync field and a single word sync field precedes 520 bytes of customer data, eliminating the overhead penalty of the prior art redundant word sync detection.

In FIGS. 6A and 6B, sequential steps start with a read over the bit sync field as indicated in a block 602. Checking whether 6 out of 12 pattern matches were found is performed as indicated in a decision block 604. When 6 out of 12 pattern matches were not found, a relaxed word sync register is set as indicated in a block 606.

Next a read again over the bit sync field is performed as indicated in a block 608. Checking whether 2 out of 12 pattern matches were found is performed as indicated in a decision block 610. When 2 out of 12 pattern matches were not found, a word sync failure is reported as indicated in a block 612.

When 6 out of 12 pattern matches were found at decision block 604, then the customer data is read as indicated in a block 614. Checking whether the read did complete successfully is performed as indicated in a decision block 616. When the read did complete successfully, a good read is reported as indicated in a block 618. When the read did not complete successfully, a bad read is reported as indicated in a block 620.

Referring also to FIG. 6B, when 2 out of 12 pattern matches were found at decision block 610, then the customer data is read as indicated in a block 622 following entry point B. Checking whether the read did complete successfully is performed as indicated in a decision block 624. When the read did complete successfully, a good read is reported as indicated in a block 626.

When the read did not complete successfully, a relaxed and early word sync register is set as indicated in a block 628. Next a read again over the bit sync field is performed as indicated in a block 630. Checking whether 2 out of 12 pattern matches were found is performed as indicated in a decision block 632. When 2 out of 12 pattern matches were not found, a word sync failure is reported as indicated in a block 634.

When 2 out of 12 pattern matches were found, a delay of 4 bytes is provided as indicated in a block 636. Then the customer data is read as indicated in a block 638. Checking whether the read did complete successfully is performed as indicated in a decision block 640. When the read did complete successfully, a good read is reported as indicated in a block 642. When the read did not complete successfully, a bad read is reported as indicated in a block 644.

While the present invention has been described with reference to the details of the embodiments of the invention shown in the drawing, these details are not intended to limit the scope of the invention as claimed in the appended claims.

What is claimed is:

1. Apparatus for thermal asperity recovery for word sync detection in data channels comprising:

a single word sync field containing a plurality of word sync patterns; said word sync patterns including repeated unique patterns;

a word sync detector receiving a read signal of said single word sync field;

said word sync detector for identifying a first subset of said plurality of word sync patterns and for starting a customer data read;

said word sync detector for failing to identify said first subset of said plurality of word sync patterns and for receiving again said read signal of said single word sync field; and said word sync detector for identifying a second predefined subset of said plurality of word sync patterns and for starting a customer data read.

2. Apparatus for thermal asperity recovery for word sync detection in data channels as recited in claim 1 wherein said single word sync field is used to provide a timing mark and signal the start of customer data.

3. Apparatus for thermal asperity recovery for word sync detection in data channels as recited in claim 1 wherein said first subset of said plurality of word sync patterns includes 4 of 8 word sync patterns.

4. Apparatus for thermal asperity recovery for word sync detection in data channels as recited in claim 1 wherein said first subset of said plurality of word sync patterns includes 6 of 12 word sync patterns.

5. Apparatus for thermal asperity recovery for word sync detection in data channels as recited in claim 4 wherein said wherein said second predefined subset of said plurality of word sync patterns includes 2 of 12 word sync patterns.

6. Apparatus for thermal asperity recovery for word sync detection in data channels as recited in claim 4 wherein said word sync detector is responsive to a failure to read customer data successfully, for receiving again said read signal of said word sync field.

7. Apparatus for thermal asperity recovery for word sync detection in data channels as recited in claim 6 wherein said word sync detector for identifying said second predefined subset of said plurality of word sync patterns and for providing a predefined delay and for starting a customer data read.

8. Apparatus for thermal asperity recovery for word sync detection in data channels as recited in claim 1 wherein said word sync detector for failing to identify said second predefined subset of said plurality of word sync patterns and for reporting a word sync failure.

9. Apparatus for thermal asperity recovery for word sync detection in data channels comprising:

a word sync field containing a plurality of word sync patterns;

a word sync detector receiving a read signal of said word sync field;

said word sync detector for identifying a first subset of said plurality of word sync patterns and for starting a customer data read;

said word sync detector for failing to identify said subset of said plurality of word sync patterns and for receiving again said read signal of said word sync field;

said word sync detector for identifying a second predefined subset of said plurality of word sync patterns and for starting a customer data read; and said first subset of said plurality of word sync patterns includes 4 of 8 word sync patterns; said second predefined subset of said plurality of word sync patterns includes 2 of 8 word sync patterns.

10. A method for thermal asperity recovery for word sync detection in data channels comprising the steps of:

reading a single word sync field containing a plurality of word sync patterns; said word sync patterns including repeated unique patterns;

providing a word sync detector to perform the steps of;
receiving a read signal of said single word sync field;
identifying a first subset of said plurality of word sync patterns and starting a customer data read;
responsive to failing to identify said subset of said plurality of word sync patterns, receiving again said read signal of said single word sync field; and
identifying a second predefined subset of said plurality of word sync patterns and starting a customer data read.

11. A method for thermal asperity recovery for word sync detection in data channels as recited in claim 10 wherein said second predefined subset of said plurality of word sync patterns is smaller than said first subset of said plurality of word sync patterns.

12. A method for thermal asperity recovery for word sync detection in data channels as recited in claim 10 wherein said second predefined subset of said plurality of word sync patterns is 2 of 12 where said first subset of said plurality of word sync patterns is 6 of 12.

13. A method for thermal asperity recovery for word sync detection in data channels as recited in claim 10 further includes the steps of failing to identify said second predefined subset of said plurality of word sync patterns and reporting a word sync failure.

14. A method for thermal asperity recovery for word sync detection in data channels as recited in claim 10 further includes the step of responsive to a failure to read customer data successfully, receiving again said read signal of said single word sync field.

15. A method for thermal asperity recovery for word sync detection in data channels as recited in claim 14 further includes the steps of;

identifying said second predefined subset of said plurality of word sync patterns, providing a predefined delay, and starting a customer data read.

16. A method for thermal asperity recovery for word sync detection in data channels comprising the steps of:

reading a word sync field containing a plurality of word sync patterns;

providing a word sync detector to perform the steps of;
receiving a read signal of said word sync field;
identifying a first subset of said plurality of word sync patterns and starting a customer data read;
responsive to failing to identify said subset of said plurality of word sync patterns, receiving again said read signal of said word sync field;
identifying a second predefined subset of said plurality of word sync patterns and starting a customer data read; and said second predefined subset of said plurality of word sync patterns is 2 of 8 and said first subset of said plurality of word sync patterns is 4 of 8.

* * * * *